US012769411B2

(12) United States Patent
Tham et al.

(10) Patent No.: US 12,769,411 B2
(45) Date of Patent: Oct. 20, 2026

(54) SELECTIVELY ACTIVATING A HANDHELD DEVICE TO CONTROL A USER INTERFACE DISPLAYED BY A WEARABLE DEVICE

(71) Applicant: Snap Inc., Santa Monica, CA (US)

(72) Inventors: Yu Jiang Tham, Seattle, WA (US); Stephen Pomes, Santa Monica, CA (US); Jonathan M. Rodriguez, II, La Habra, CA (US); Nir Daube, Pacific Palisades, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/220,948

(22) Filed: May 28, 2025

(65) Prior Publication Data

US 2025/0291435 A1 Sep. 18, 2025

Related U.S. Application Data

(63) Continuation of application No. 18/218,938, filed on Jul. 6, 2023, now Pat. No. 12,340,036, which is a continuation of application No. 17/007,155, filed on Aug. 31, 2020, now Pat. No. 11,733,789.

(60) Provisional application No. 62/907,787, filed on Sep. 30, 2019.

(51) Int. Cl.

| | |
|---|---|
| ***G06F 3/0354*** | (2013.01) |
| ***G06F 3/01*** | (2006.01) |
| ***G06F 3/0346*** | (2013.01) |
| ***G06F 3/038*** | (2013.01) |
| ***G06F 3/04883*** | (2022.01) |

(52) U.S. Cl.

CPC .......... *G06F 3/03547* (2013.01); *G06F 3/014* (2013.01); *G06F 3/0346* (2013.01); *G06F 3/038* (2013.01); *G06F 3/04883* (2013.01); *G06F 2203/0331* (2013.01); *G06F 2203/0382* (2013.01); *G06F 2203/0384* (2013.01)

(58) Field of Classification Search

CPC .................................................. G06F 3/03547

See application file for complete search history.

(56) References Cited

U.S. PATENT DOCUMENTS

| | | | |
|---|---|---|---|
| 8,106,887 | B2 | 1/2012 | Park et al. |
| 8,203,502 | B1 | 6/2012 | Chi et al. |
| 10,019,216 | B2 | 7/2018 | Fujiwaka |
| 12,340,036 | B2 | 6/2025 | Tham et al. |
| 2006/0211454 | A1 | 9/2006 | Park et al. |
| 2013/0007653 | A1 | 1/2013 | Stolyarov et al. |
| 2014/0160424 | A1 | 6/2014 | Benko et al. |
| 2015/0022438 | A1 | 1/2015 | Hong |
| 2015/0130738 | A1 | 5/2015 | Park |
| 2016/0077582 | A1 | 3/2016 | Song et al. |
| 2016/0216792 | A1 | 7/2016 | Ogawa et al. |

(Continued)

*Primary Examiner* — William Boddie
*Assistant Examiner* — Andrew B Schnirel
(74) *Attorney, Agent, or Firm* — CM Law PLLC; Stephen J. Weed

(57) ABSTRACT

Systems, devices, media, and methods are presented for selectively activating and suspending control of a graphical user interface by two or more electronic devices. A portable eyewear device includes a display projected onto at least one lens assembly and a primary touchpad through which the user may access a graphical user interface (GUI) on the display. A handheld accessory device, such as a ring, includes an auxiliary touchpad that is configured to emulate the primary touchpad. The eyewear processor temporarily suspends inputs from one touchpad when it detects an activation signal from the other touchpad.

19 Claims, 15 Drawing Sheets

(56) References Cited

U.S. PATENT DOCUMENTS

| | | | |
|---|---|---|---|
| 2017/0322622 | A1 | 11/2017 | Hong et al. |
| 2017/0329419 | A1 | 11/2017 | Dearman et al. |
| 2017/0337897 | A1 | 11/2017 | Jung et al. |
| 2018/0164588 | A1 | 6/2018 | Leppanen et al. |
| 2019/0155385 | A1 | 5/2019 | Lim et al. |
| 2019/0391391 | A1 | 12/2019 | Pazmino et al. |
| 2020/0142497 | A1 | 5/2020 | Zhu et al. |

SELECTIVELY ACTIVATING A HANDHELD DEVICE TO CONTROL A USER INTERFACE DISPLAYED BY A WEARABLE DEVICE

CROSS-REFERENCE TO RELATED APPLICATIONS

This application is a Continuation of U.S. application Ser. No. 18/218,938 filed on Jul. 6, 2023, which is a Continuation of U.S. application Ser. No. 17/007,155 filed on Aug. 31, 2020, now U.S. Pat. No. 11,733,789, which claims priority to U.S. Provisional Application Ser. No. 62/907,787 filed on Sep. 30, 2019, the contents of both of which are incorporated fully herein by reference.

TECHNICAL FIELD

Examples set forth in the present disclosure relate to portable electronic devices, including wearable devices such as eyewear. More particularly, but not by way of limitation, the present disclosure describes systems and methods for selectively activating and suspending control of a graphical user interface by two or more electronic devices.

BACKGROUND

Many types of computers and electronic devices available today, including mobile devices (e.g., smartphones, tablets, and laptops), handheld devices (e.g., smart rings, special-purpose accessories), and wearable devices (e.g., smart-glasses, digital eyewear, headwear, headgear, and head-mounted displays), include image displays, input devices (e.g., pointing devices, touch-sensitive surfaces), and graphical user interfaces (GUIs) through which a user can interact with displayed content.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
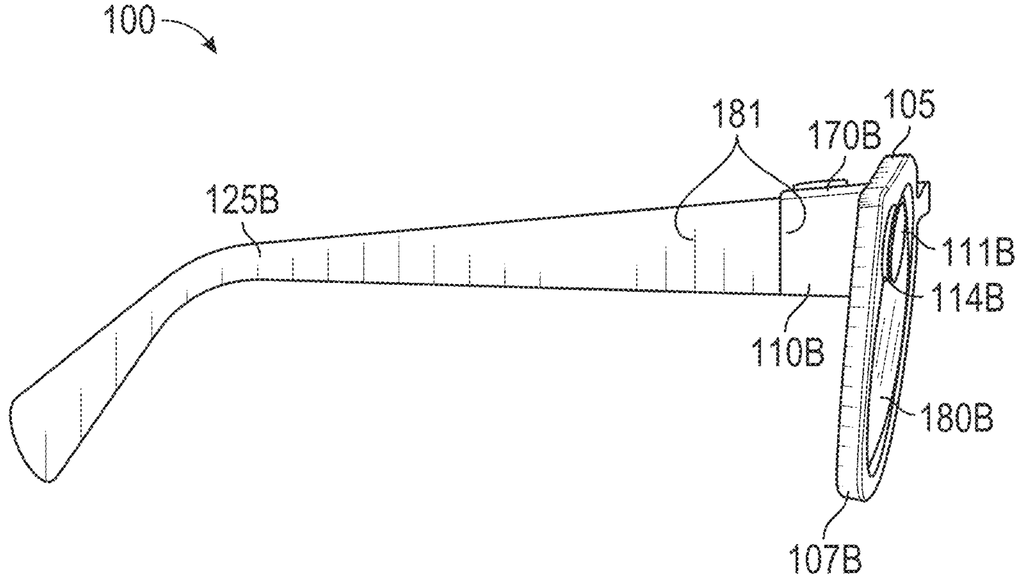
FIG. 1A is a side view (right) of an example hardware configuration of an eyewear device with a primary input surface, which may be utilized in a selective control and transition system.

Various implementations and details are described with reference to an example: a control and transition system for selectively activating and suspending control of a graphical user interface by two or more electronic devices. A portable eyewear device includes a display projected onto at least one lens assembly and a primary touchpad through which the user may access a graphical user interface (GUI) on the display. A handheld accessory device, such as a ring, includes an auxiliary touchpad that is configured to emulate the primary touchpad. If and when the eyewear processor detects an activation signal from the auxiliary touchpad, it temporarily suspends inputs from the primary touchpad. If and when the eyewear processor detects a reactivation signal from the primary touchpad, it temporarily suspends inputs from the auxiliary touchpad. In this aspect, the system manages the input from at least two input devices (e.g., touchpads) including control of the transitions from one to the other. In addition to the selective control and transition system, the systems and methods described herein may be applied to and used with any of a variety of systems, especially those in which a user desires to use two or more electronic devices to access and control a graphical user interface (GUI).

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The term "emulate" as used herein means to approximately mirror, match, or reproduce in a second device the features, functions, or actions of a first device.

The orientations of the eyewear device, the handheld device, associated components and any other complete devices incorporating a camera or an inertial measurement unit such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera inertial measurement unit as constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The present disclosure describes systems, methods, techniques, instruction sequences, and computing machine program products for implementing a graphical user interface (GUI) for use with eyewear devices. In some implementations, the GUI is implemented using swiping motions in orthogonal directions (up, down, left, right) with one or more contextual menus that are always available to the user, with one or more clear call-to-action menu items, and with visual feedback to confirm when an action has been detected and received. The contextual menu items may be designed to facilitate memorization, in order to allow a user to take fast action.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear 100 may include a touchpad on the left side.

The surface of the touchpad 181 is configured to detect finger touches, taps, and gestures (e.g., moving touches) for use with a GUI displayed by the eyewear, on a display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the screen of the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, when the identified finger gesture is a single tap on the touchpad 181, this initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear 100 includes a right visible-light camera 114B. As further described herein, two cameras 114A, 114B capture image information for a scene from two separate viewpoints. The two captured images may be used to project a three-dimensional display onto a screen for viewing with 3D glasses.

Figure 1B:
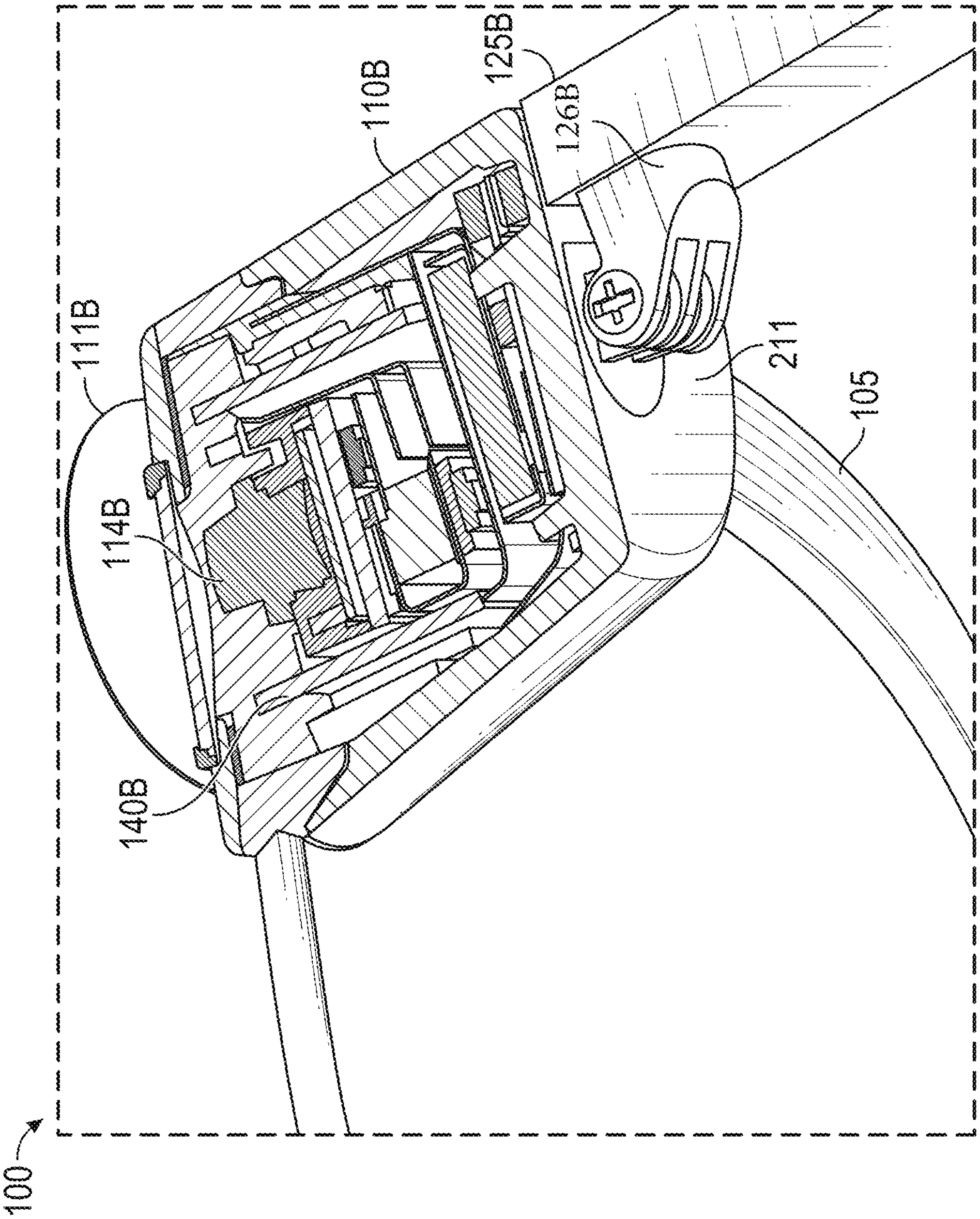
FIG. 1B is a top, partly sectional view of a right chunk of the eyewear device of FIG. 1A depicting a right visible-light camera, and a circuit board.
Figure 1C:
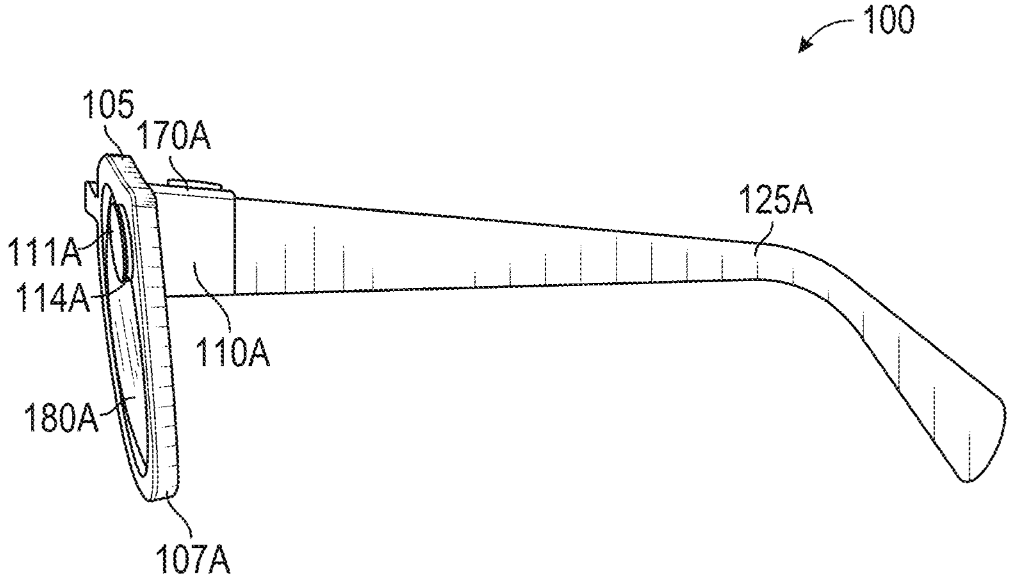
FIG. 1C is a side view (left) of an example hardware configuration of the eyewear device of FIG. 1A, which shows a left visible-light camera.
Figure 1D:
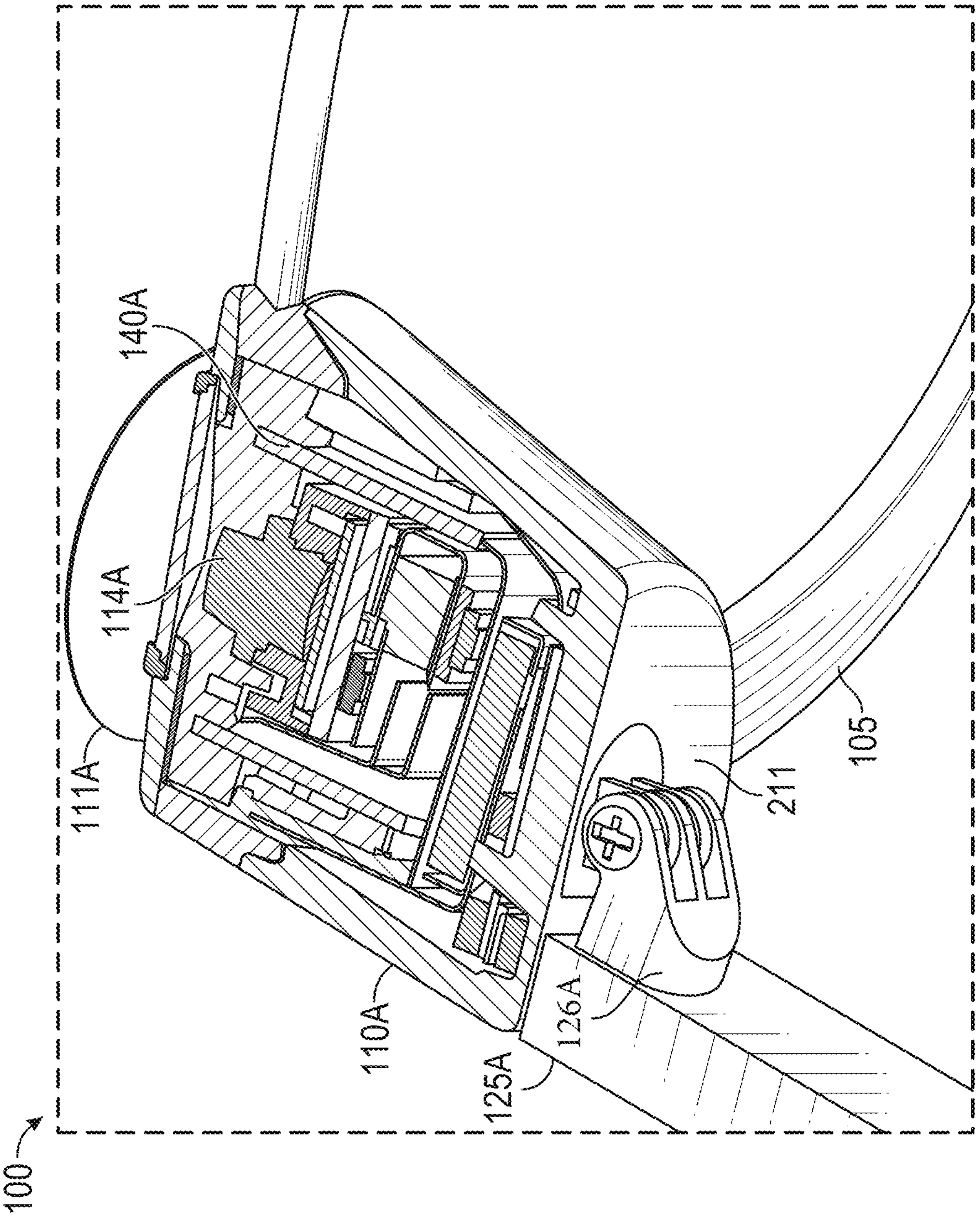
FIG. 1D is a top, partly sectional view of a left chunk of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right chunk 110B. As shown in FIGS. 1C-D, the eyewear device 100 also includes a left visible-light camera 114A.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 813. Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels. The "angle of coverage" describes the angle range that a lens of visible-light cameras 114A, 114B or infrared camera 220 (sec FIG. 2A) can effectively image. Typically, the camera lens produces an image circle that is large enough to cover the film or sensor of the camera completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640 p (e.g., 640×480 pixels for a total of 0.3 megapixels), 720 p, or 1080 p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The left and right raw images captured by respective visible-light cameras 114A, 114B are in the two-dimensional space domain and comprise a matrix of pixels on a two-dimensional coordinate system that includes an X-axis for horizontal position and a Y-axis for vertical position. Each pixel includes a color attribute value (e.g., a red pixel light value, a green pixel light value, and a blue pixel light value); and a position attribute (e.g., an X-axis coordinate and a Y-axis coordinate).

In order to capture stereo images for later display as a three-dimensional projection, the image processor 912 (shown in FIG. 4) may be coupled to the visible-light cameras 114A, 114B to receive and store the visual image information. A timestamp for each image may be added by the image processor 912 or another processor which controls operation of the visible-light cameras 114A, 114B, which act as a stereo camera to simulate human binocular vision. The timestamp on each pair of images allows the images to be displayed together as part of a three-dimensional projection. Three-dimensional projections produce an immersive, life-like experience that is desirable in a variety of contexts, including virtual reality (VR) and video gaming.

Figure 3:
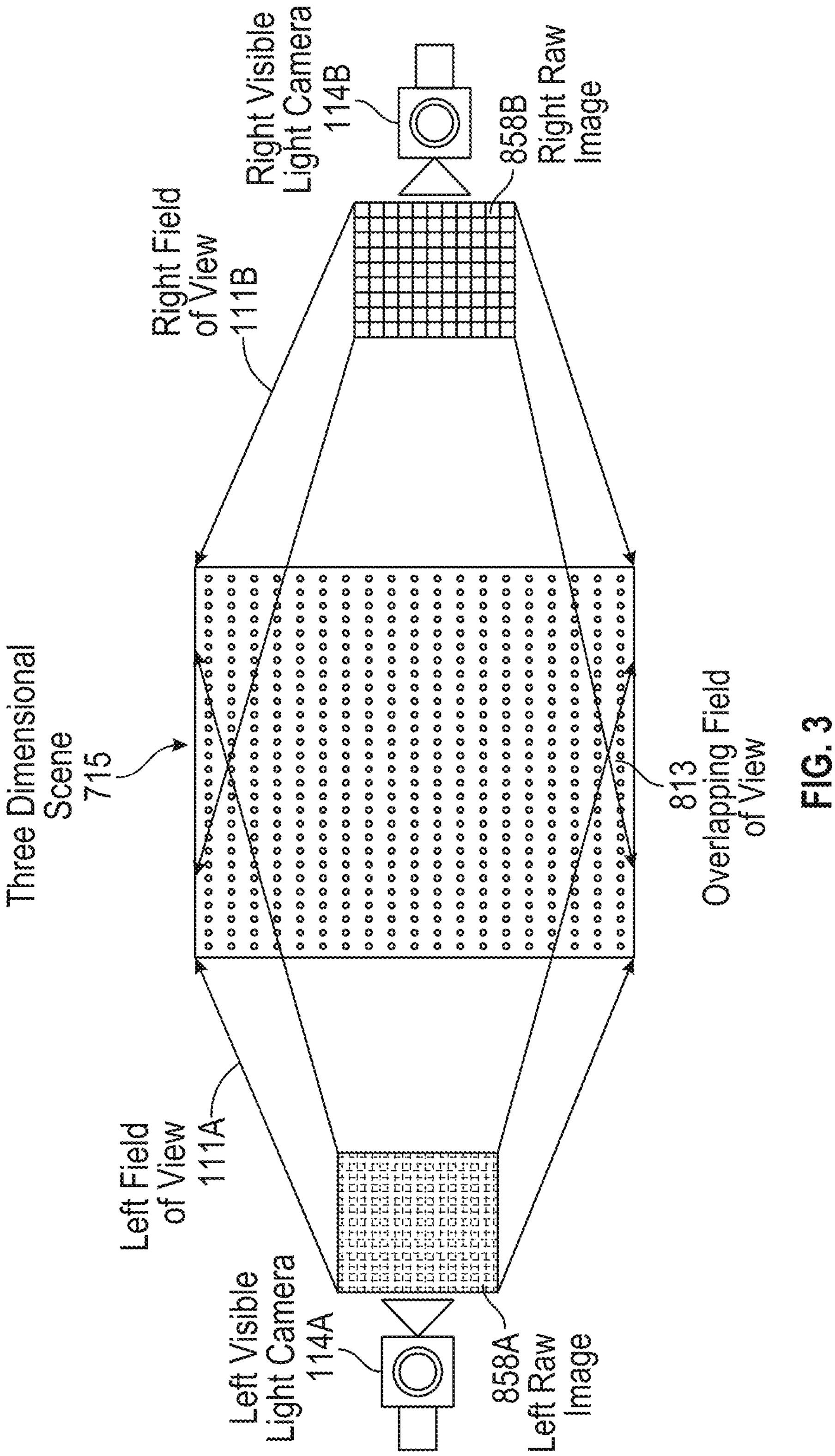
FIG. 3 is a diagrammatic depiction of a three-dimensional scene, a left raw image captured by a left visible-light camera, and a right raw image captured by a right visible-light camera.

FIG. 3 is a diagrammatic depiction of a three-dimensional scene 715, a left raw image 858A captured by a left visible-light camera 114A, and a right raw image 858B captured by a right visible-light camera 114B. The left field of view 111A may overlap, as shown, with the right field of view 111B. The overlapping field of view 813 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 858A, 858B may be processed to include a timestamp, which allows the images to be displayed together as part of a three-dimensional projection.

For the capture of stereo images, as illustrated in FIG. 3, a pair of raw red, green, and blue (RGB) images are captured of a real scene 715 at a given moment in time—a left raw image 858A captured by the left camera 114A and right raw image 858B captured by the right camera 114B. When the pair of raw images 858A, 858B are processed (e.g., by the image processor 912), depth images are generated. The generated depth images may be viewed on an optical assembly 180A, 180B of an eyewear device, on another display (e.g., the image display 880 on a mobile device 890), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, and a blue pixel light valuc); a position attribute (e.g., an X location coordinate, a Y location coordinate, and a Z location coordinate); a texture attribute; a reflectance attribute; or combination thereof. The texture attribute quantifies the perceived texture of the depth image, such as the spatial arrangement of color or intensities in a region of vertices of the depth image.

In one example, the selective control and transition system 1000 includes the eyewear device 100, which includes a frame 105 and a left temple 110A extending from a left lateral side 170A of the frame 105 and a right temple 110B extending from a right lateral side 170B of the frame 105. The eyewear device 100 may further include at least two visible-light cameras 114A, 114B which may have overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 858A from the left side of scene 715. The eyewear device 100 further includes a right visible-light camera 114B with a right field of view 111B. The right camera 114B is connected to the frame 105 or the right temple 110B to capture a right raw image 858B from the right side of scene 715.

FIG. 1B is a top cross-sectional view of a right chunk 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left chunk 110A of the eyewear device of FIG. IC depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The left hinge 126A connects the left chunk 110A to a left temple 125A of the eyewear device 100. The right hinge 126B connects the right chunk 110B to a right temple 125B of the eyewear device 100. In some examples, components of the visible-light cameras 114A, B, the flexible PCBs 140A, B, or other electrical connectors or contacts may be located on the temples 125A, B or hinges 126A, B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via WiFi).

Figure 2A:
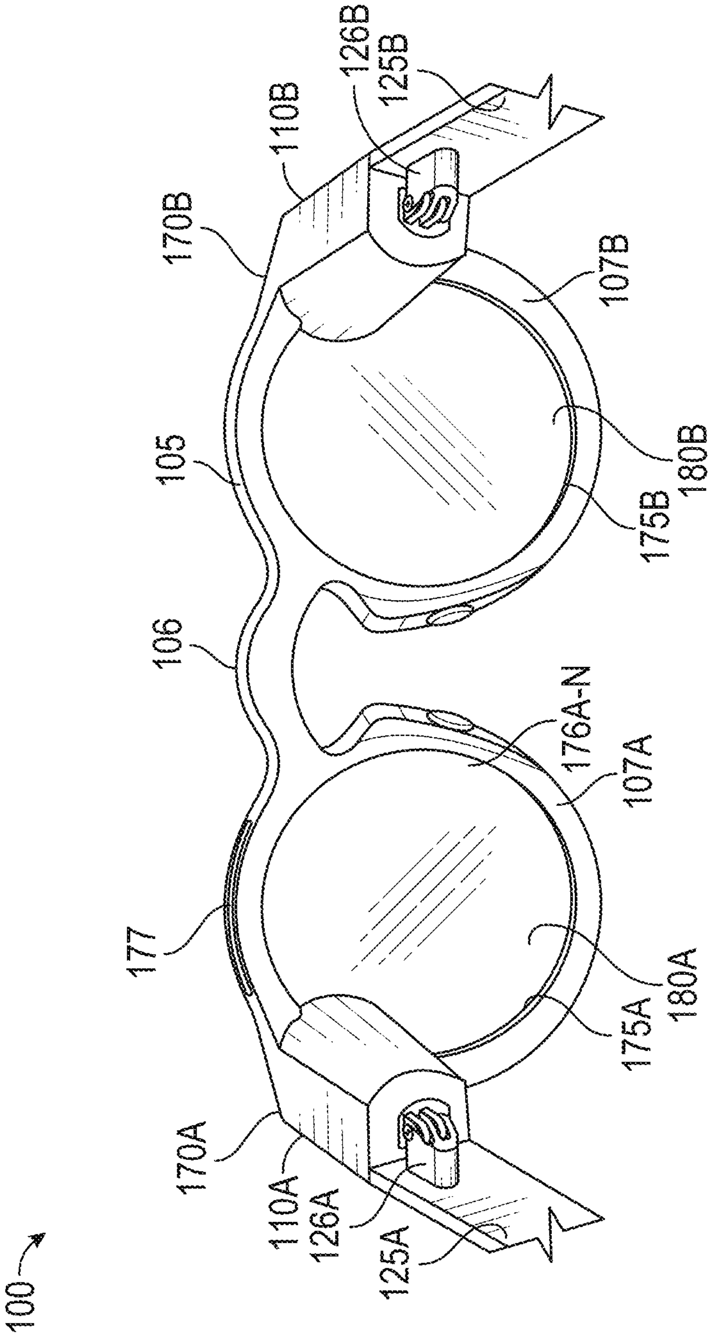
FIGS. 2A and 2B are rear views of example hardware configurations of an eyewear device utilized in the selective control and transition system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right chunk 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right chunk 110B in which an opening is formed with an outward-facing angle of coverage, but in a different outwardly direction. The coupling can also be indirect via intervening components.

As shown in FIG. 1B, flexible PCB 140B is disposed inside the right chunk 110B and is coupled to one or more other components housed in the right chunk 110B. Although shown as being formed on the circuit boards of the right chunk 110B, the right visible-light camera 114B can be formed on the circuit boards of the left chunk 110A, the temples 125A, 125B, or the frame 105.

Figure 2B:
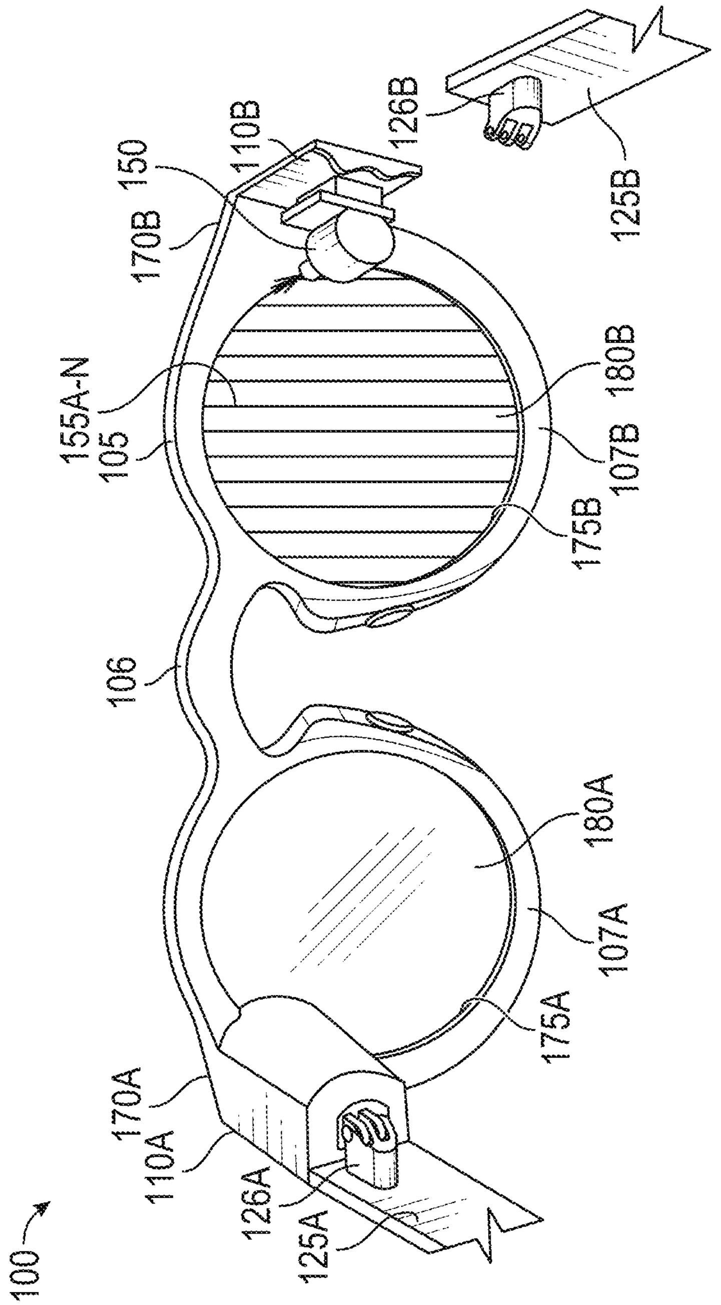

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective sides 170A, 170B (as illustrated) or implemented as separate components attached to the frame 105 on the respective sides 170A, 170B. Alternatively, the chunks 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 912 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective lateral sides 170A, 170B (as illustrated) or implemented as separate components attached to the frame 105 on the respective sides 170A, 170B. Alternatively, the chunks 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double-prime, A through N, not shown) which are configured to interact with light from the right projector 150B. In this example, the eyewear device 100 includes a left display and a right display.

Figure 4:
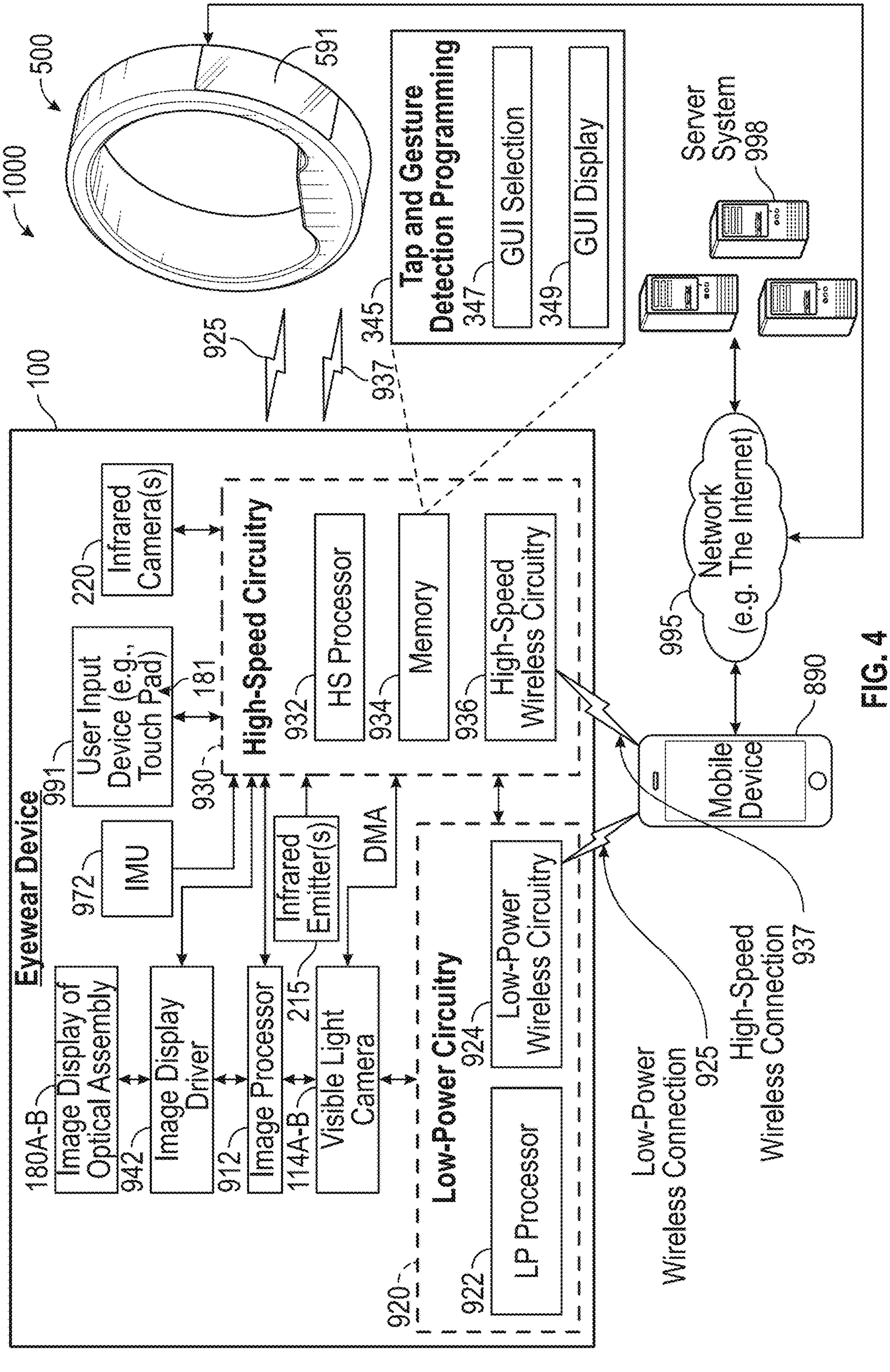
FIG. 4 is a functional block diagram of an example selective control and transition system including a wearable device (e.g., an eyewear device), a mobile device, a handheld device (e.g., a smart ring), and a server system connected via various networks.

FIG. 4 is a functional block diagram of an example selective control and transition system 1000 including a wearable device 100 (e.g., an eyewear device), a mobile device 890, a handheld device 500 (e.g., a ring), and a server system 998 connected via various networks 995 such as the Internet. The system 1000 includes a low-power wireless connection 925 and a high-speed wireless connection 937 between the eyewear device 100 and a mobile device 890—and, in some implementations, as shown, between the eyewear device 100 and the ring 500.

Finger tap and gesture detection programming 345, including GUI selection programming 347 and GUI display programming 349, are stored in memory 934 for execution by one of the processors 932, 922 of the eyewear 100. The eyewear device 100 further includes a user input device 991 (e.g., a touch sensor or touchpad 181) to receive input from a user.

The eyewear device 100 includes one or more visible-light cameras 114A, 114B which may be capable of capturing still images or video, as described herein. The cameras 114A, 114B may have a direct memory access (DMA) to high-speed circuitry 930. A pair of cameras 114A, 114B may function as a stereo camera, as described herein. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 220.

The eyewear device 100 further includes two image displays of each optical assembly 180A, 180B (one associated with the left side 170A and one associated with the right side 170B). The eyewear device 100 also includes an image display driver 942, an image processor 912, low-power circuitry 920, and high-speed circuitry 930. The image displays of each optical assembly 180A, 180B are for presenting images, including still images and video. The image display driver 942 is coupled to the image displays of each optical assembly 180A, 180B in order to control the images displayed.

The components shown in FIG. 4 for the eyewear device 100 are located on one or more circuit boards, for example a PCB or flexible PCB, located in the rims or temples. Alternatively, or additionally, the depicted components can be located in the chunks, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 930 includes a high-speed processor 932, a memory 934, and high-speed wireless circuitry 936. In the example, the image display driver 942 is coupled to the high-speed circuitry 930 and operated by the high-speed processor 932 in order to drive the left and right image displays of each optical assembly 180A, 180B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executes a software architecture for the eyewear device 100 that is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

The low-power circuitry 920 includes a low-power processor 922 and low-power wireless circuitry 924. The low-power wireless circuitry 924 and the high-speed wireless circuitry 936 of the eyewear device 100 can include short range transceivers (Bluetooth™) and wireless wide, local, or wide-area network transceivers (e.g., cellular or WiFi). Mobile device 890, including the transceivers communicating via the low-power wireless connection 925 and the high-speed wireless connection 937, may be implemented using details of the architecture of the eyewear device 100, as can other elements of the network 995.

Memory 934 includes any storage device capable of storing various data and applications, including, among other things, camera data generated by the left and right visible-light cameras 114A, 114B, the infrared camera(s) 220, the image processor 912, and images generated for display by the image display driver 942 on the image display of each optical assembly 180A, 180B. Although the memory 934 is shown as integrated with high-speed circuitry 930, the memory 934 in other examples may be an independent, standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Figure 5:
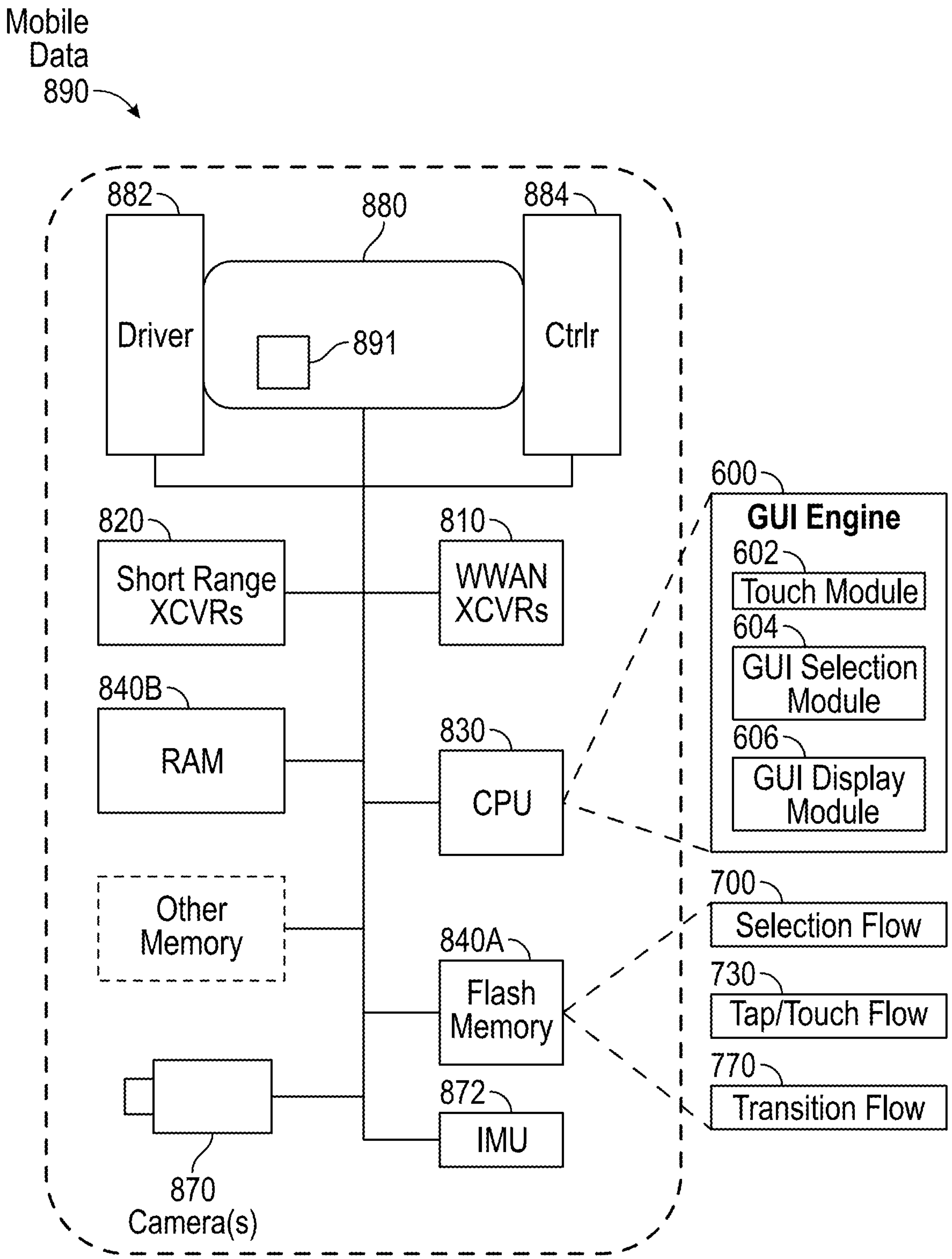
FIG. 5 is a diagrammatic representation of an example hardware configuration for a mobile device of the selective control and transition system of FIG. 4, including a block diagram of a GUI engine with modules for operating a GUI.

As shown in FIG. 4, the high-speed processor 932 of the eyewear device 100 can be coupled to the camera system (visible-light cameras 114A, 114B), the image display driver 942, the user input device 991, and the memory 934. As shown in FIG. 5, the CPU 830 of the mobile device 890 may be coupled to a camera system 870, a mobile display driver 882, a user input layer 891, and a memory 840A.

The eyewear device 100 can perform all or a subset of any of the functions described herein which result from the execution of the selective control and transition system 1000 in the memory 934 by one of the processors 932, 922 of the eyewear device 100. The mobile device 890 can perform all or a subset of any of the functions described herein which result from the execution of the selective control and transition system 1000 in the flash memory 840A by the CPU 830 of the mobile device 890. Functions can be divided in the selective control and transition system 1000 such that the ring 500 collects raw input data from its auxiliary touchpad 591 and sends it to the eyewear device 100 which performs the selecting and displaying functions relative to the operation of the GUI.

The server system 998 may be one or more computing devices as part of a service or network computing system, for example, that include a processor, a memory, and network communication interface to communicate over the network 995 with an eyewear device 100 and a mobile device 890.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 942. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a loudspeaker positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force of touches or touch gestures, or other tactile-configured elements), and audio input components (e.g., a microphone), and the like. The mobile device 890 and the server system 998 may include alphanumeric, pointer-based, tactile, audio, and other input components.

In some examples, the eyewear device 100 includes a collection of motion-sensing components referred to as an inertial measurement unit 972. The motion-sensing components may be micro-electro-mechanical systems (MEMS) with microscopic moving parts, often small enough to be part of a microchip. The inertial measurement unit (IMU) 972 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS receiver, one or more transceivers to generate relative position coordinates, altitude sensors or barometers, and other orientation sensors. Such positioning system coordinates can also be received over the wireless connections 925, 937 from the mobile device 890 via the low-power wireless circuitry 924 or the high-speed wireless circuitry 936.

The IMU 972 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 934 and executed by the high-speed processor 932 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The mobile device 890 may be a smartphone, tablet, laptop computer, access point, or any other such device capable of connecting with eyewear device 100 using both a low-power wireless connection 925 and a high-speed wireless connection 937. Mobile device 890 is connected to server system 998 and network 995. The network 995 may include any combination of wired and wireless connections.

Figure 6:
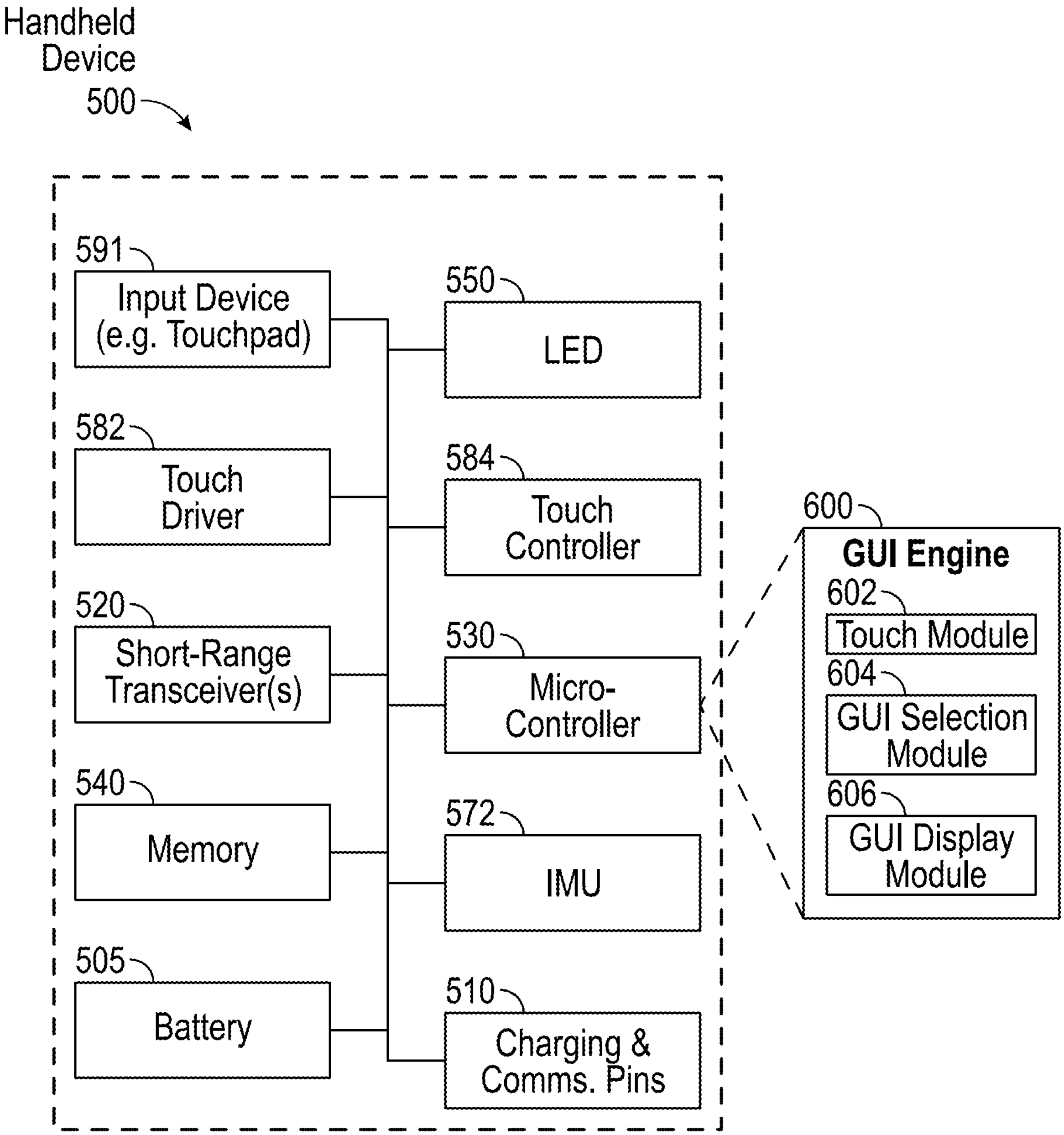
FIG. 6 is a diagrammatic representation of an example hardware configuration for a handheld device (e.g., a smart ring) of the selective control and transition system of FIG. 4.

The selective control and transition system 1000, as shown in FIG. 4, includes a computing device, such as mobile device 890, coupled to an eyewear device 100 and to a handheld device or ring 500 over a network. The selective control and transition system 1000 includes a memory for storing instructions and a processor for executing the instructions. Execution of the instructions of the selective control and transition system 1000 by the processor 932 configures the eyewear device 100 to cooperate with the ring 500 or the mobile device 890. The system 1000 may utilize the memory 934 of the eyewear device 100 or the memory elements 840A, 840B of the mobile device 890 (FIG. 5) or the memory 540 of the ring 500 (FIG. 6). Also, the system 1000 may utilize the processor elements 932, 922 of the eyewear device 100 or the central processing unit (CPU) 830 of the mobile device 890 (FIG. 5) or the microcontroller 530 of the ring 500 (FIG. 6). Furthermore, the system 1000 may further utilize the memory and processor elements of the server system 998. In this aspect, the memory and processing functions of the selective control and transition system 1000 can be shared or distributed across the eyewear device 100, the mobile device 890, the ring 500, or the server system 998.

FIG. 5 is a high-level functional block diagram of an example mobile device 890. Mobile device 890 includes a flash memory 840A which stores programming to be executed by the CPU 830 to perform all or a subset of the functions described herein. As shown a GUI engine 600 may reside on the CPU 830 and accessed for operating the graphical user interface (GUI) on the mobile device 890 as well as other devices in the system 1000. One or more flow charts, as shown, may be stored in the memory 840A.

The GUI engine 600 in some implementations includes a touch module 602, a selection module 604, and a display module 606. The touch module 602 is a computer module for execution on a processor (e.g., CPU 830). The touch module 602 detects the inputs sensed by the touchpad 181 on the eyewear device 100—or from the auxiliary touchpad 591 on the ring 500. The ring 500 offers users a break from manipulating the touchpad 181 on the side of the eyewear 100, which may occupy the hands for long periods or cause fatigue. In response to the detected inputs, the touch module 602 identifies the finger taps, touches, holds, slides, and swipes which match the inputs. The GUI engine 600 may also reside, in whole or in part, on the microcontroller 530 of the handheld device or ring 500 (FIG. 6).

In some implementations the touch module 602 also detects when an activation signal is sensed by the auxiliary touchpad 591 on the ring 500. In response, the touch module 602 temporarily suspends all inputs from the primary touchpad 181 on the eyewear device 100. With the auxiliary touchpad 591 now serving as the controlling input device, the touch module 602 detects when an auxiliary finger touch is sensed by the auxiliary touchpad 591 on the ring 500 and, in response, presents the next or subsequent GUI on the display. In this aspect, the touch module 602 controls which input device has priority.

The touch module 602 also detects when a reactivation signal is sensed by the primary touchpad 181 on the eyewear 100, signaling that the primary touchpad 181 should now control the GUI. In response, the touch module 602 temporarily suspends all inputs from the auxiliary touchpad 591 on the ring 600. With the primary touchpad 181 now serving as the controlling input device, the touch module 602 detects when a primary finger touch is sensed by the primary touchpad 181 on the eyewear 100 and, in response, presents the first GUI on the display.

The GUI selection module 604 is a computer module for execution on a processor of a computer platform that identifies which GUI to display to the user. The GUI selection module 604 monitors applications running on the computer platform and selects a GUI based on notifications from the applications. For example, if a text application receives an incoming email and provides a notification, the GUI selection module 604 selects the appropriate GUI. If another application such as a camera application provides a notification that a picture was taken, the GUI selection module 604 selects the appropriate GUI. Additionally, the GUI selection module 604 selects a GUI based on which input surface has primary control of the GUI. For example, when the touchpad 181 on the right lateral surface of the eyewear 100 is primary, the GUI is presented from a right-hand perspective. When a touchpad on the left is primary, the GUI is presented from a left-hand perspective. When the auxiliary touchpad 591 on the ring 500 is primary, the GUI is presented from a straight or head-on perspective.

The GUI display module 606 is a computer module for execution on a processor of a computer platform that displays the GUIs to the user on at least one optical assembly 180A, 180B of the eyewear device 100. The display module 606 also controls the transitions from one GUI to another. For example, if the user presses the left touchpad and then the right touchpad 181, the GUI display module 606 will transition from the GUI with the left-hand perspective to the GUI with the right-hand perspective.

Mobile device 890 may include a camera 870 that comprises at least two visible-light cameras (first and second visible-light cameras with overlapping fields of view) or at least one visible-light camera and a depth sensor with substantially overlapping fields of view. Flash memory 840A may further include multiple images or video, which are generated via the camera 870.

As shown, the mobile device 890 includes an image display 880, a mobile display driver 882 to control the image display 880, and a controller 884. In the example of FIG. 4, the image display 880 includes a user input layer 891 (e.g., a touchscreen) that is layered on top of or otherwise integrated into the screen used by the image display 880.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 890 with a user interface that includes a touchscreen input layer 891 for receiving input (by touch, multi-touch, or gesture, and the like, by hand, stylus or other tool) and an image display 880 for displaying content.

As shown in FIG. 4, the mobile device 890 includes at least one digital transceiver (XCVR) 810, shown as WWAN XCVRs, for digital wireless communications via a wide-area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (i.e., the network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as “4G.” For example, the transceivers 810, 820 provide two-way wireless communication of information including digitized audio signals, still image and video signals, web page information for display as well as web-related inputs, and various types of mobile message communications to/from the mobile device 890.

The mobile device 890 further includes a microprocessor that functions as a central processing unit (CPU); shown as CPU 830 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 830, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 830 or processor hardware in smartphone, laptop computer, and tablet.

The CPU 830 serves as a programmable host controller for the mobile device 890 by configuring the mobile device 890 to perform various operations, for example, in accordance with instructions or programming executable by CPU 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 890 includes a memory or storage system, for storing programming and data. In the example, the memory system may include a flash memory 840A, a random-access memory (RAM) 840B, and other memory components, as needed. The RAM 840B serves as short-term storage for instructions and data being handled by the CPU 830, e.g., as a working data processing memory. The flash memory 840A typically provides longer-term storage.

Hence, in the example of mobile device 890, the flash memory 840A is used to store programming or instructions for execution by the CPU 830. Depending on the type of device, the mobile device 890 stores and runs a mobile operating system through which specific applications are executed. Examples of mobile operating systems include Google Android, Apple IOS (for iPhone or iPad devices), Windows Mobile, Amazon Fire OS, RIM BlackBerry OS, or the like.

FIG. 6 is a high-level functional block diagram of an example handheld device, such as a ring 500. The ring 500, as shown, includes an input device 591 (e.g., a touchpad), a lamp 550 (e.g., a light-emitting diode), a touch driver 582, a touch controller 584, a short-range transceiver 520, a microcontroller 530, a memory 540, an inertial measurement unit (IMU) 572, a battery 505, and one or more charging and communications pins 510.

As shown, the GUI engine 600 may also reside, in whole or in part, on the microcontroller 530 of the ring 500. The modules 602, 604, 606 operate with respect to the input device or touchpad 591 on the ring 500 in the same or similar manner in which they operate with respect to the touchpad 181 on the eyewear 100.

The ring 500 includes at least one short-range transceiver 520 that is configured for short-range network communication, such as via NFC, VLC, DECT, ZigBee, Bluetooth™, BLE (Bluetooth Low-Energy), or WiFi. The short-range transceiver(s) 520 may take the form of any available two-way wireless local area network (WLAN) transceiver of a type that is compatible with one or more standard protocols of communication implemented in wireless local area networks, such as one of the Wi-Fi standards under IEEE 802.11.

The ring 500 may also include a global positioning system (GPS) receiver. Alternatively, or additionally, the ring 500 can utilize either or both the short-range transceiver(s) 520 for generating location coordinates for positioning. For example, cellular network, WiFi, or Bluetooth™ based positioning systems can generate very accurate location coordinates, particularly when used in combination. Such location coordinates can be transmitted to one or more eyewear devices 100, or to one or more mobile devices 890, over one or more network connections via the transceiver(s) 520.

The transceivers 520 (i.e., the network communication interface) conforms to one or more of the various digital wireless communication standards utilized by modern mobile networks. Examples of WWAN transceivers include but are not limited to transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as “4G.” For example, the transceivers 520 provide two-way wireless communication of information including digitized audio signals, still image and video signals, web page information for display as well as web-related inputs, and various types of mobile message communications to or from the ring 500.

The ring 500 further includes a microcontroller 530 that functions as a central processing unit (CPU) for the ring 500, as shown in FIG. 6. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the microprocessor. The microcontroller 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the microcontroller 530 or processor hardware in smartphone, laptop computer, and tablet.

The microcontroller 530 serves as a programmable host controller for the selective control and transition system 1000 by configuring the ring 500 to perform various operations; for example, in accordance with instructions or programming executable by the microcontroller 530. For example, such operations may include various general operations of the ring 500, as well as operations related to the programming for applications that reside on the ring 500. Although a processor may be configured by use of hardwired logic, typical processors in mobile devices are general processing circuits configured by execution of programming.

The ring 500 includes one or more memory elements 540 for storing programming and data. The memory 540 may include a flash memory, a random-access memory (RAM), or other memory elements, as needed. The memory 540 stores the programming and instructions needed to perform all or a subset of the functions described herein. The RAM, if present, may operate as short-term storage for instructions and data being handled by the microcontroller 530. Depending on the particular type of handheld device, the ring 500 stores and runs an operating system through which specific applications are executed. The operating system may be a mobile operating system, such as Google Android, Apple IOS, Windows Mobile, Amazon Fire OS, RIM BlackBerry OS, or the like.

In some examples, the ring 500 includes a collection of motion-sensing components referred to as an inertial measurement unit 572. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the ring 500 (including the acceleration due to gravity) relative to three orthogonal axes (x, y, z). The gyroscope senses the angular velocity of the ring 500 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the ring 500 relative to magnetic north. The position of the ring 500 may be determined by location sensors, such as a GPS receiver, one or more transceivers to generate relative position coordinates, altitude sensors or barometers, and other orientation sensors. Such positioning system coordinates can also be received over the wireless connections 925, 937 from the mobile device 890 via the low-power wireless circuitry 924 or the high-speed wireless circuitry 936.

The IMU 572 may include or cooperate with a digital motion processor or programming that gathers the raw data from the components and compute a number of useful values about the position, orientation, and motion of the ring 500. For example, the acceleration data gathered from the accelerometer can be integrated to obtain the velocity relative to each axis (x, y, z); and integrated again to obtain the position of the ring 500 (in linear coordinates, x, y, and z). The angular velocity data from the gyroscope can be integrated to obtain the position of the ring 500 (in spherical coordinates). The programming for computing these useful values may be stored in memory 934 and executed by the high-speed processor 932 of the eyewear device 100.

The ring 500 may optionally include additional peripheral sensors, such as biometric sensors, specialty sensors, or display elements integrated with the ring 500. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

Figure 7:
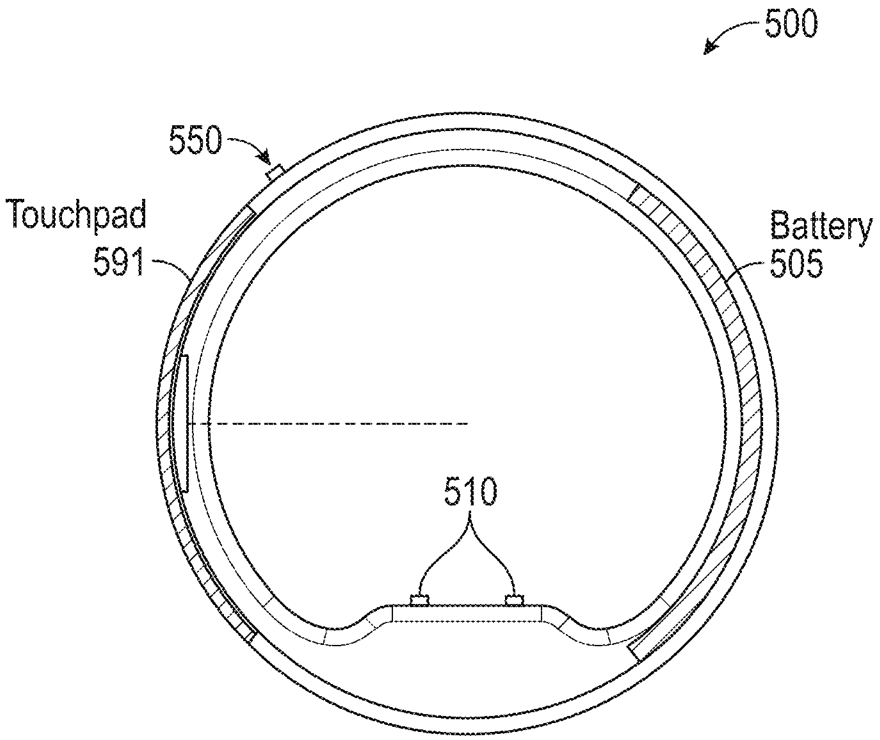
FIG. 7 is a schematic view of an example hardware configuration for a handheld device (e.g., a smart ring) of the selective control and transition system of FIG. 4.

FIG. 7 is a schematic view of an example hardware configuration for a ring 500. The touchpad 591, a shown, may be sized and shaped to conform closely to an outer surface of the ring 500. The touchpad 591 may extend lengthwise to span one-quarter of the circumference of the ring 500 in some implementations. The ring 500 may also include a lamp such as an LED 550. The battery 505 may be sized and shaped to fit within the body of the ring 500, with connections to one or more charging and communications pins 510. As shown, the ring 500 may include an internal space (beneath the pins 510 in this example) to house a variety of components, such as a touch driver 582, a touch controller 584, a short-range transceiver 520, a microcontroller 530, a memory 540, and an inertial measurement unit (IMU) 572.

Figure 8:
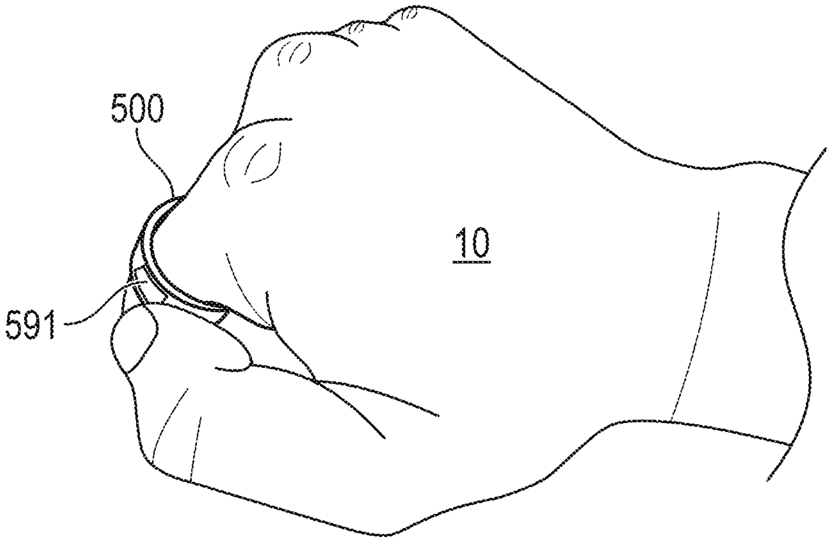
FIG. 8 is a perspective illustration of an example handheld device (e.g., a smart ring) of the selective control and transition system of FIG. 4.

FIG. 8 is a perspective illustration of a hand 10 holding an example handheld device (e.g., a smart ring 500) of the selective control and transition system 1000 described herein. As shown, the ring 500 is supported on the first or index finger, with the thumb engaging the touchpad 591. Other holding postures and placements of the ring 500 on or by the hand 10 are common, depending on the dexterity and preference of the user.

Figure 9:
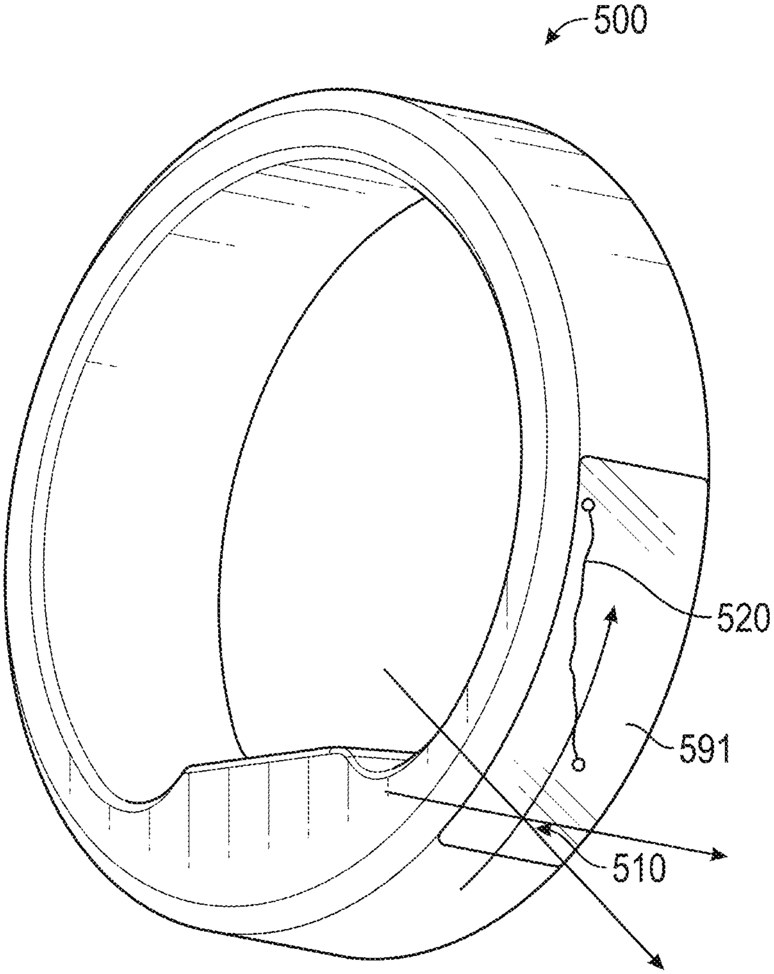
FIG. 9 is a perspective illustration of a segment representing an example touch input on an input device (e.g., a touchpad) of a handheld device (e.g., a smart ring) of the selective control and transition system of FIG. 4.

FIG. 9 is a perspective illustration of a segment 520 representing an example touch input on the touchpad 591 of a ring 500. In another aspect, the method of sensing touch input may include collecting track data from the input device or touchpad 591. The track data is associated with a segment 520 traversed by a finger along the touchpad 591. The segment 520 may be similar to a line segment, without meeting the geometrical definition of a line segment. The system 1000 in some implementations may detect the segment 520 and construct a best-fit line segment that approximates the segment 520 in length and heading.

As shown in FIG. 9, the segment 520 has a length and a heading relative to a touchpad coordinate system 510. The length of the segment 520 may be used to establish a value. The heading of the segment 520 relative to the coordinate system 510 may be used to establish a direction (up, down, left, right), a sign (positive or negative), or another characteristic associated with the touch input.

Figure 10A:
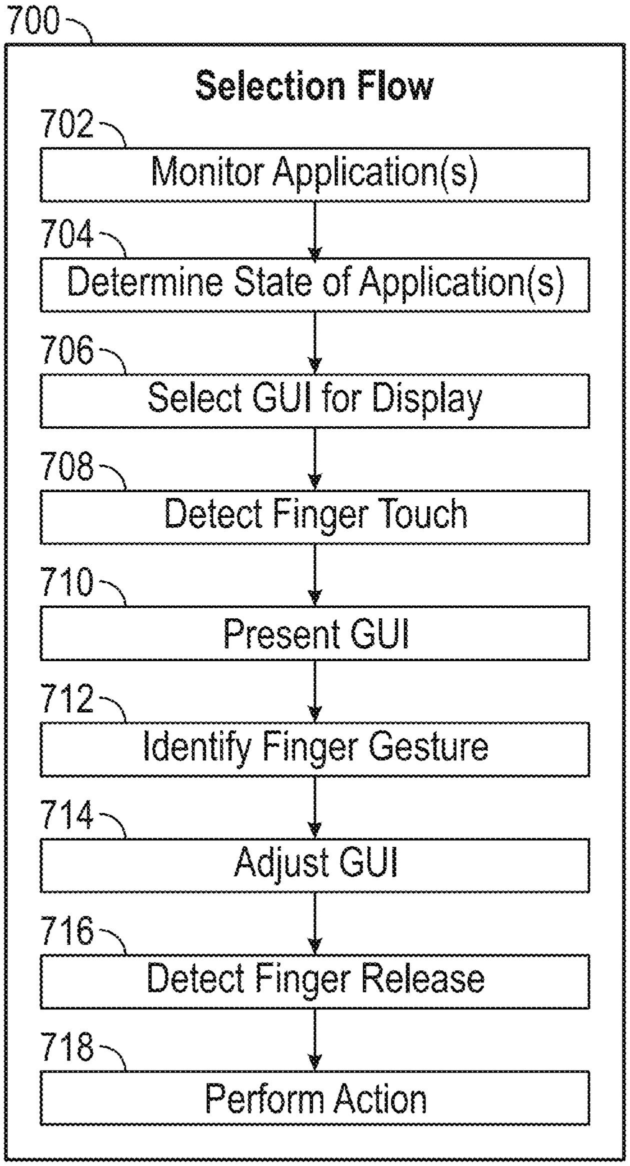
FIGS. 10A, 10B, and 10C are example flow charts for operating a GUI on a wearable device (e.g., an eyewear device) of the selective control and transition system of FIG. 4.
Figure 10B:
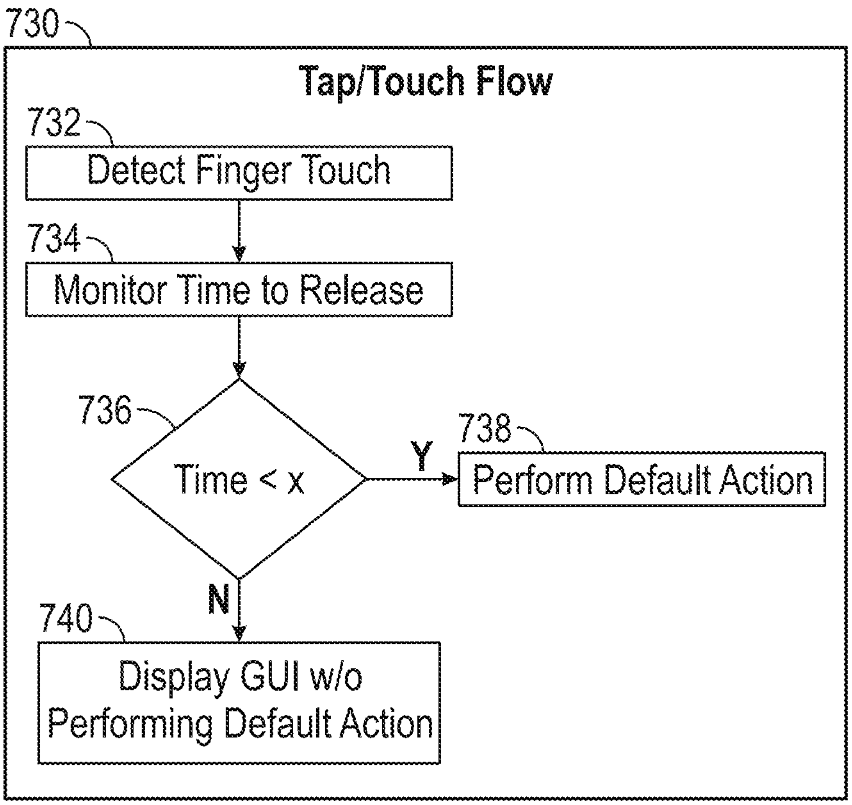
Figure 10C:
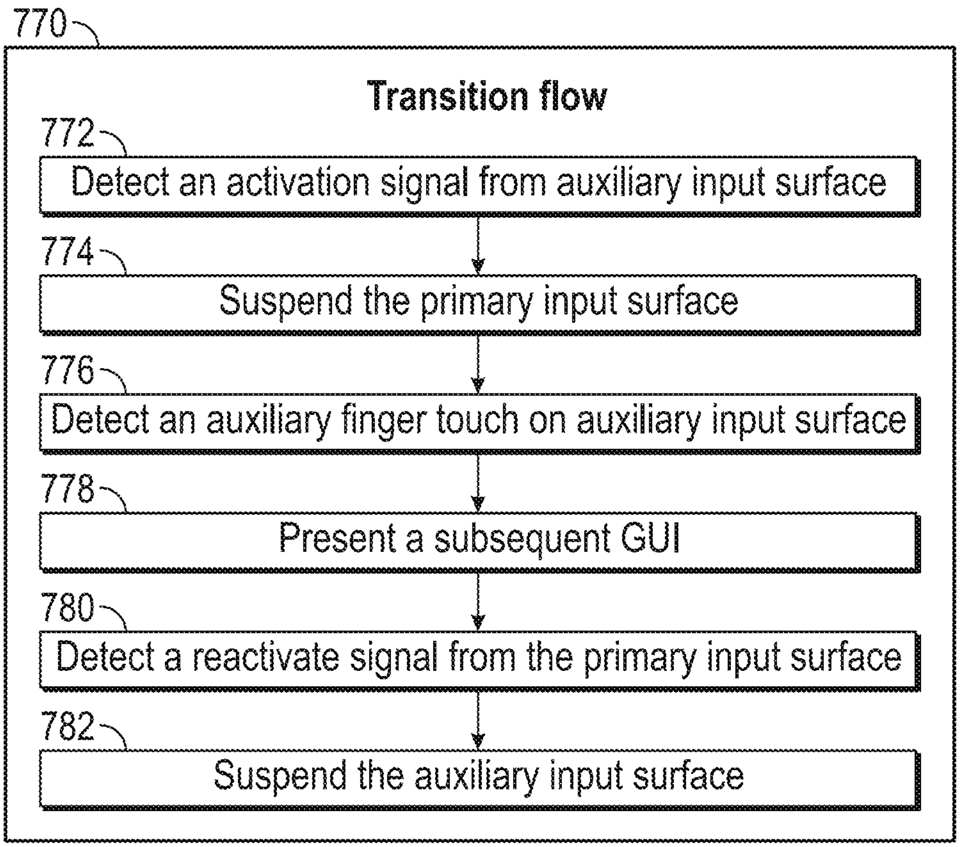

FIGS. 10A, 10B, and 10C are example flow charts for operating a GUI using the GUI engine 600. Although the steps are described with reference to the eyewear 100 described herein, other implementations of the steps described, for other types of devices, will be understood by one of skill in the art from the description herein. Additionally, it is contemplated that one or more of the steps shown in FIGS. 10A, 10B, and 10C may be omitted, performed simultaneously or in a series, performed in an order other than illustrated and described, or performed in conjunction with additional steps.

As shown in FIG. 10A, the Selection Flow 700 depicts steps for selecting an action using a GUI. At step 702, monitor the application(s): the GUI selection module 604 of the eyewear device 100 (e.g., processors 922, 932 and associated programming instructions) monitors applications running on the eyewear device 100 (e.g., a texting app, a camera app, etc.) or an associated mobile device 890. At step 704, determine the state of the application(s): the GUI selection module 604 of the eyewear device 100 monitors applications for notification events (e.g., a message received by a texting app, an image captured by a camera app, etc.).

At step 706, select a GUI for display: the GUI selection module 604 of the mobile device 890 selects a GUI. The GUI selection is based on the input surface 181 or the state of the application(s). For example, a processor implementing the GUI selection module 604 selects a left-hand perspective GUI when the input surface on the left hand side of the eyewear is in use, a right-hand perspective GUI when the right touchpad 181 is in use, and a straight-on perspective GUI when the input is received from the auxiliary touchpad 591 on an accessory device such as a ring 500. Additionally, different actions are available through the GUI when a text message is received by a texting app and when an image is captured by a camera app.

At step 708, detect a finger touch on the input surface/touch pad: the touch module 602 detects the finger touch based on input from the input surface 181.

At step 710, present the GUI: the GUI display module 606 displays the GUI such that it becomes visible on at least one optical assembly 180A, 180B of the eyewear 100 when the finger is detected and remains visible until it is removed.

At step 712, identify a finger gesture on the input surface: the touch module 602 monitors the position of the finger while it is on the input surface and processes the positions to identify gestures. For example, a movement in a generally downward direction is perceived as a swipe down.

At step 714, adjust the GUI: the GUI display module 606 adjusts the GUI in response to the finger movement on the input surface.

The processor implementing the GUI display module 606 may display the actual position of the finger on the input surface in a corresponding virtual position on a virtual input surface of the GUI—as presented on a display. Additionally, as the finger is moved in a particular direction, the label associated with that direction may be highlighted to indicate that action will be selected upon removal of the finger from the input surface.

At step 716, detect a finger release and, at step 718, perform the action: the touch module 602 detects the finger release based on input from the input surface and the eyewear 100 performs the selected action associated with the identified gesture.

As shown in FIG. 10B, the Tap/Touch Flow 730 depicts steps for performing actions in response to a tap or a touch. At step 732, detect a finger touch. The touch module 602 detects the finger touch based on input from the input surface. At step 734, monitor the time to release the finger. The touch module 602 starts a timer when the finger touch is detected, which runs until the finger is removed. At decision block 736, compare the monitored time to a predetermined time (e.g., 100 milliseconds). If the time is less than the predetermined time, perform the default action in step 738 (e.g., a default action option from the GUI or another predefined action). Otherwise, display the GUI without performing the default action in step 740.

As shown in FIG. 10B, the Transition Flow 770 depicts the steps for performing actions in response to touch input either from the primary touchpad 181 on the eyewear 100 or from the auxiliary touchpad 591 on the ring 500. In some implementations the touch module 602 at step 772 detects when an activation signal is sensed by the auxiliary touchpad 591 on the ring 500. In response, at step 774 the touch module 602 temporarily suspends all inputs from the primary touchpad 181 on the eyewear device 100. With the auxiliary touchpad 591 now serving as the controlling input device, the touch module 602 at step 776 detects when an auxiliary finger touch is sensed by the auxiliary touchpad 591 on the ring 500 and, in response, at step 778 presents the next or subsequent GUI on the display. In this aspect, the touch module 602 controls which input device has priority.

The touch module 602 will continue to detect at step 776 additional inputs sensed by the auxiliary touchpad 591 on the ring 500, and to present at step 778 the next or subsequent GUI on the display, unless and until it detects a reactivation signal from the primary touchpad 181 on the eyewear 100. In this aspect, the touch module 602 operates in a loop between steps 776 and 778 such that the input device with priority is persistent.

The touch module 602 in some implementation detects at step 780 when a reactivation signal is sensed by the primary touchpad 181 on the eyewear 100, signaling that the primary touchpad 181 should now have priority and control the operation of the GUI. In response, the touch module 602 at step 782 temporarily suspends all inputs from the auxiliary touchpad 591 on the ring 600. With the primary touchpad 181 now serving as the controlling input device, the touch module 602—as described in the Selection Flow 700 and the Tap or Touch Flow 730—detects when a primary finger touch is sensed by the primary touchpad 181 on the eyewear 100 and, in response, presents the first GUI on the display.

The display 650 in some implementations, is projected onto a surface, such as a head-mounted screen or onto at least one lens assembly (e.g., an optical element 180A, 180B of an eyewear device 100) as described herein. The eyewear device 100 may include a projector 150 (FIG. 2B) that is positioned and configured to project the physical environment 20, the cursor 661, and the virtual object 700 in motion along the path 665 onto at least one optical lens assembly (e.g., the right optical element 180B). In this implementation, the ring 500 cooperates with the eyewear 100 to present the GUI on the display 650.

The selective control and transition system 1000, as shown in FIG. 4, in some implementations, includes a handheld device (e.g., ring 500) and a portable device (e.g., eyewear 100). The ring 500 includes a microcontroller 530, an input device (e.g., touchpad 591), and an inertial measurement unit 572. The eyewear 100, which is in communication with the ring 500, includes a processor 932, a memory 934, and a display (e.g., the image display associated with at least one lens or optical assembly 180A, 180B).

Any of the message composition and sharing functionality described herein for the eyewear device 100, the ring 500, the mobile device 890, and the server system 998 can be embodied in one or more computer software applications or sets of programming instructions, as described herein. According to some examples, "function," "functions," "application," "applications," "instruction," "instructions,"

or "programming" are program(s) that execute functions defined in the programs. Various programming languages can be employed to produce one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of controlling an eyewear device, wherein the eyewear device comprises a processor, a memory, a display, a frame, a right temple extending from the frame and supporting a touchpad, and a left temple extending from the frame and supporting a left-side touchpad, and wherein the method comprises:

detecting a notification associated with an application in active operation on the eyewear device;

detecting a finger touch associated with at least one of the touchpad or an auxiliary touchpad, wherein the auxiliary touchpad is supported by a handheld device in wireless communication with the eyewear device, and wherein detecting the finger touch comprises measuring a touch duration;

in response to the touch duration compared to a predetermined time, executing a default action associated with the notification;

presenting on the display a graphical user interface in accordance with the notification;

detecting an activation signal associated with the auxiliary touchpad;

in response to detecting the activation signal, selectively suspending operation of the touchpad;

detecting a left-side activation signal associated with the left-side touchpad;

selectively suspending operation of the touchpad;

detecting a reactivation signal associated with at least one of the touchpad or the left-side touchpad; and selectively suspending operation of the left-side touchpad.

2. The method of claim 1, wherein presenting the graphical user interface comprises:

presenting an alternative action associated with the notification;

detecting a subsequent finger touch associated with at least one of the touchpad or the auxiliary touchpad; and executing the alternative action in response to the subsequent finger touch.

3. The method of claim 1, wherein detecting the finger touch comprises:

identifying a finger gesture relative to the auxiliary touchpad, wherein the finger gesture comprises at least one of a touch, a tap, a double tap relative to a timer, a finger touch and a release associated with a duration relative to the timer, a slide, a swipe, or a moving touch; and adjusting the graphical user interface in response to the finger gesture.

4. The method of claim 1, further comprising:

detecting a second reactivation signal associated with at least one of the touchpad or the auxiliary touchpad; and selectively suspending operation of the auxiliary touchpad.

5. The method of claim 1, wherein detecting the finger touch comprises:

detecting a position associated with the finger touch relative to the auxiliary touchpad;

presenting on the display a virtual input surface corresponding in shape and time to the auxiliary touchpad;

presenting on the display a virtual cursor relative to the virtual input surface; and presenting the virtual cursor at a virtual cursor position corresponding in location and time to the position.

6. The method of claim 5, wherein detecting the position comprises:

collecting track data associated with a segment traversed by the finger touch; and presenting the virtual cursor at the virtual cursor position in accordance with the track data.

7. The method of claim 5, wherein presenting the graphical user interface comprises:

presenting an alternative action associated with the notification, wherein the alternative action is associated with a menu position relative to the virtual input surface;

estimating the virtual cursor position relative to the menu position;

detecting a subsequent finger touch associated with the virtual cursor position; and executing the alternative action in response to the subsequent finger touch.

8. The method of claim 1, wherein the handheld device comprises a local memory, a wireless transceiver, and a body defining an outer surface, wherein the method comprises sizing and shaping the auxiliary touchpad to conform to a portion of the outer surface, and wherein detecting the finger touch comprises selectively storing the finger touch in at least one of the memory or the local memory.

9. A system comprising:

an eyewear device comprising a processor, a memory, a display, a frame, a right temple extending from the frame and supporting a touchpad, and a left temple extending from the frame and supporting a left side touchpad;

a handheld device comprising a local memory, a wireless transceiver, and an auxiliary touchpad; and programming stored in at least one of the memory or the local memory, wherein the programming when executed is operative to perform functions, including functions to:

detect a notification associated with an application in active operation on the eyewear device;

detect a finger touch associated with at least one of the touchpad or the auxiliary touchpad;

measure a touch duration associated with the finger touch;

in response to the touch duration compared to a predetermined time, execute a default action associated with the notification;

present on the display a graphical user interface in accordance with the notification;

detect an activation signal associated with the auxiliary touchpad;

in response to detecting the activation signal, selectively suspend operation of the touchpad;

detect a left-side activation signal associated with the left-side touchpad;

selectively suspend operation of the touchpad;

detect a reactivation signal associated with at least one of the touchpad or the left-side touchpad; and selectively suspend operation of the left-side touchpad.

10. The system of claim 9, wherein the function to present the graphical user interface comprises further functions to:

present an alternative action associated with the notification;

detect a subsequent finger touch associated with at least one of the touchpad or the auxiliary touchpad; and execute the alternative action in response to the subsequent finger touch.

11. The system of claim 9, wherein the function to detect the finger touch comprises further functions to:

initiate a timer;

identify a finger gesture relative to the auxiliary touchpad, wherein the finger gesture comprises at least one of a touch, a tap, a double tap relative to the timer, a finger touch and a release associated with a duration relative to the timer, a slide, a swipe, or a moving touch, and adjust the graphical user interface in response to the finger gesture.

12. The system of claim 9, wherein the programming when executed is operative to perform further functions, including further functions to:

selectively store the finger touch in at least one of the memory or the local memory;

detect a second reactivation signal associated with at least one of the touchpad or the auxiliary touchpad; and selectively suspend operation of the auxiliary touchpad.

13. The system of claim 9, wherein the function to detect the finger touch comprises further functions to:

detect a position associated with the finger touch relative to the auxiliary touchpad;

present on the display a virtual input surface corresponding in shape and time to the auxiliary touchpad;

present on the display a virtual cursor relative to the virtual input surface; and present the virtual cursor at a virtual cursor position corresponding in location and time to the position.

14. The system of claim 13, wherein the function to present the graphical user interface comprises further functions to:

present an alternative action associated with the notification, wherein the alternative action is associated with a menu position relative to the virtual input surface;

estimate the virtual cursor position relative to the menu position;

detect a subsequent finger touch associated with the virtual cursor position; and execute the alternative action in response to the subsequent finger touch.

15. The system of claim 9, wherein the handheld device further comprises:

a body defining an inner cavity and an outer surface, wherein the auxiliary touchpad extends along a portion of the outer surface; and a power source supported by the inner cavity, wherein the power source is coupled to the local memory, the wireless transceiver, and the auxiliary touchpad.

16. A non-transitory computer-readable medium storing instructions which, when executed, are operative to cause an electronic processor to perform steps, including the steps of:

wirelessly pairing a handheld device with an eyewear device, wherein the eyewear device comprises a processor, a memory, a display a frame a right temple extending from the frame and supporting a touchpad, and a left temple extending from the frame and supporting a left-side touchpad, wherein the handheld device comprises a local processor, a local memory, and an auxiliary touchpad, and wherein the instructions are stored in at least one of the memory or the local memory;

detecting a notification associated with an application in active operation on the eyewear device;

detecting a finger touch associated with at least one of the touchpad or the auxiliary touchpad, wherein detecting the finger touch comprises measuring a touch duration;

in response to the touch duration compared to a predetermined time, executing a default action associated with the notification;

presenting on the display a graphical user interface in accordance with the notification;

detecting an activation signal associated with the auxiliary touchpad; and in response to detecting the activation signal, selectively suspending operation of the touchpad;

detecting a left-side activation signal associated with the left-side touchpad;

selectively suspending operation of the touchpad;

detecting a reactivation signal associated with at least one of the touchpad or the left side touchpad; and selectively suspending operation of the left-side touchpad.

17. The non-transitory computer-readable medium of claim 16, wherein the instructions, when executed, are operative to cause the electronic processor to perform further steps, including the further steps of:

presenting on the display an alternative action associated with the notification;

detecting a subsequent finger touch associated with at least one of the touchpad or the auxiliary touchpad; and executing the alternative action in response to the subsequent finger touch.

18. The non-transitory computer-readable medium of claim 16, wherein the instructions, when executed, are operative to cause the electronic processor to perform further steps, including the further steps of:

detecting a second reactivation signal associated with at least one of the touchpad or the auxiliary touchpad; and selectively suspending operation of the auxiliary touchpad.

19. The non-transitory computer-readable medium of claim 16, wherein the instructions, when executed, are operative to cause the electronic processor to perform further steps, including the further steps of:

detecting a position associated with the finger touch relative to the auxiliary touchpad;

presenting on the display a virtual input surface corresponding in shape and time to the auxiliary touchpad;

presenting on the display a virtual cursor relative to the virtual input surface;

presenting the virtual cursor at a virtual cursor position corresponding in location and time to the position;

presenting on the display an alternative action associated with the notification, wherein the alternative action is associated with a menu position relative to the virtual input surface;

estimating the virtual cursor position relative to the menu position;

detecting a subsequent finger touch associated with the virtual cursor position; and executing the alternative action in response to the subsequent finger touch.

* * * * *